(12) United States Patent
Lee et al.

(10) Patent No.: US 11,962,003 B2
(45) Date of Patent: Apr. 16, 2024

(54) NEGATIVE ELECTRODE ACTIVE MATERIAL FOR LITHIUM SECONDARY BATTERY, AND NEGATIVE ELECTRODE AND LITHIUM SECONDARY BATTERY INCLUDING THE SAME

(71) Applicant: LG CHEM, LTD., Seoul (KR)

(72) Inventors: Su-Min Lee, Daejeon (KR); Je-Young Kim, Daejeon (KR); Se-Mi Park, Daejeon (KR); Yong-Ju Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 561 days.

(21) Appl. No.: 17/271,861

(22) PCT Filed: Jan. 21, 2020

(86) PCT No.: PCT/KR2020/001045
§ 371 (c)(1),
(2) Date: Feb. 26, 2021

(87) PCT Pub. No.: WO2020/153728
PCT Pub. Date: Jul. 30, 2020

(65) Prior Publication Data
US 2021/0320294 A1 Oct. 14, 2021

(30) Foreign Application Priority Data
Jan. 21, 2019 (KR) .................... 10-2019-0007694

(51) Int. Cl.
*H01M 4/38* (2006.01)
*H01M 4/36* (2006.01)
(Continued)

(52) U.S. Cl.
CPC .......... *H01M 4/386* (2013.01); *H01M 4/366* (2013.01); *H01M 4/583* (2013.01); *H01M 10/0525* (2013.01); *H01M 2004/027* (2013.01)

(58) Field of Classification Search
CPC .......... H01M 10/052; H01M 10/0525; H01M 2004/027; H01M 4/133; H01M 4/134;
(Continued)

(56) References Cited

U.S. PATENT DOCUMENTS

2006/0035149 A1  2/2006  Nanba et al.
2013/0089784 A1  4/2013  Cho et al.
(Continued)

FOREIGN PATENT DOCUMENTS

CN    104011910 A    8/2014
CN    107251282 A   10/2017
(Continued)

OTHER PUBLICATIONS

International Search Report (PCT/ISA/210) issued in PCT/KR2020/001045, dated May 19, 2020.

*Primary Examiner* — Victoria H Lynch
(74) *Attorney, Agent, or Firm* — Birch, Stewart, Kolasch & Birch, LLP

(57) ABSTRACT

A negative electrode active material for a lithium secondary battery which includes: silicon particles; and a coating layer surrounding respective silicon particles, wherein the silicon particles have a full width at half maximum (FWHM) of peak ranging from 2 to 10 in the particle diameter distribution having an average particle diameter ($D_{50}$) of 1 μm to 30 μm, and the coating layer includes at least one selected from the group consisting of carbon and a polymer. A negative electrode and lithium secondary battery including the negative electrode active material are also disclosed.

8 Claims, 2 Drawing Sheets

(51) Int. Cl.
  *H01M 4/583* (2010.01)
  *H01M 10/0525* (2010.01)
  *H01M 4/02* (2006.01)

(58) Field of Classification Search
  CPC .. H01M 4/1393; H01M 4/1395; H01M 4/366;
      H01M 4/386; H01M 4/583; H01M 4/587;
      H01M 4/62; H01M 4/625; Y02E 60/10
  See application file for complete search history.

(56) References Cited

U.S. PATENT DOCUMENTS

| | | |
|---|---|---|
| 2014/0178754 A1 | 6/2014 | Kim et al. |
| 2015/0017527 A1 | 1/2015 | Lee et al. |
| 2016/0329555 A1 | 11/2016 | Lee et al. |
| 2017/0373315 A1 | 12/2017 | Lee et al. |
| 2018/0048015 A1 | 2/2018 | Lee et al. |
| 2018/0323425 A1 | 11/2018 | Choi et al. |
| 2018/0331354 A1 | 11/2018 | Kim et al. |

FOREIGN PATENT DOCUMENTS

| | | |
|---|---|---|
| EP | 2 387 089 A1 | 11/2011 |
| JP | 2013-180935 A | 9/2013 |
| JP | 2017-188319 A | 10/2017 |
| KR | 10-2005-0086713 A | 8/2005 |
| KR | 10-2007-0059717 A | 6/2007 |
| KR | 10-2013-0037090 A | 4/2013 |
| KR | 10-2014-0132791 A | 11/2014 |
| KR | 10-2015-0008327 A | 1/2015 |
| KR | 10-2015-0078059 A | 7/2015 |
| KR | 10-2016-0001481 A | 1/2016 |
| KR | 10-2016-0149862 A | 12/2016 |
| KR | 10-2017-0104035 A | 9/2017 |
| KR | 10-2017-0136855 A | 12/2017 |
| KR | 10-2018-0000145 A | 1/2018 |
| WO | WO 2017/222113 A1 | 12/2017 |

NEGATIVE ELECTRODE ACTIVE MATERIAL FOR LITHIUM SECONDARY BATTERY, AND NEGATIVE ELECTRODE AND LITHIUM SECONDARY BATTERY INCLUDING THE SAME

TECHNICAL FIELD

The present disclosure relates to a negative electrode active material for a lithium secondary battery, and a negative electrode and lithium secondary battery including the same. More particularly, the present disclosure relates to a negative electrode active material for a lithium secondary battery which provides improved life characteristics and output characteristics, and a negative electrode and lithium secondary battery including the same.

The present application claims priority to Korean Patent Application No. 10-2019-0007694 filed on Jan. 21, 2019 in the Republic of Korea, the disclosures of which are incorporated herein by reference.

BACKGROUND ART

As technical development and needs for mobile instruments have been increased, secondary batteries as energy sources for such mobile instruments have been increasingly in demand. Among such secondary batteries, lithium secondary batteries having high energy density and voltage, long cycle life and a low discharge rate have been commercialized and used widely.

A lithium secondary battery has a structure having an electrode assembly which includes a positive electrode and a negative electrode each including an active material coated on an electrode current collector, a porous separator interposed between the positive electrode and negative electrode, and a lithium salt-containing electrolyte injected thereto. Each electrode is obtained by applying slurry containing an active material, a binder and a conductive material dispersed in a solvent to a current collector, followed by drying and pressing.

In addition, fundamental characteristics of a lithium secondary battery, such as capacity, output and life, are significantly affected by the negative electrode active material. To maximize the battery characteristics, it is required for a negative electrode active material to have an electrochemical reaction potential near that of lithium metal, to show high reaction reversibility with lithium ions and to provide a high diffusion rate of lithium ions in the active material. As materials satisfying such requirements, carbonaceous materials have been used widely.

Such carbonaceous active materials show high stability and reversibility, but have a limitation in terms of capacity. Therefore, recently, Si-based materials having high theoretical capacity has been used as negative electrode active materials in the fields requiring high-capacity batteries, such as electric vehicles, hybrid electric vehicles, or the like.

However, Si-based negative electrode active materials are problematic in that they undergo a change in crystal structure during lithium intercalation and storage to cause volumetric swelling. Such volumetric swelling causes cracking to cause breakage of active material particles or mis-contact between the active material and a current collector, resulting in the problem of degradation of charge/discharge cycle life of a battery.

DISCLOSURE

Technical Problem

The present disclosure is designed to solve the problems of the related art, and therefore the present disclosure is directed to providing a silicon-based negative electrode active material which provides improved life characteristics and output characteristics.

The present disclosure is also directed to providing a negative electrode including the negative electrode active material, and a lithium secondary battery including the same.

Technical Solution

In one aspect of the present disclosure, there is provided a negative electrode active material for a lithium secondary battery as defined in any one of the following embodiments.

According to the first embodiment of the present disclosure, there is provided a negative electrode active material for a lithium secondary battery which includes: silicon particles; and a coating layer surrounding respective-silicon particles, wherein the silicon particles have a full width at half maximum (FWHM) of peak ranging from 2 to 10 in the particle diameter distribution having an average particle diameter ($D_{50}$) of 1 μm to 30 μm, and the coating layer includes at least one selected from the group consisting of carbon and a polymer.

According to the second embodiment of the present disclosure, there is provided the negative electrode active material for a lithium secondary battery as defined in the first embodiment, wherein the silicon particles have a full width at half maximum of 4-8.

According to the third embodiment of the present disclosure, there is provided the negative electrode active material for a lithium secondary battery as defined in the first or the second embodiment, wherein the particle diameter distribution of the silicon particles is controlled by using an air classifying mill.

According to the fourth embodiment of the present disclosure, there is provided the negative electrode active material for a lithium secondary battery as defined in any one of the first to the third embodiments, wherein the coating layer is present in an amount of 3 parts by weight to 10 parts by weight based on 100 parts by weight of the silicon particles.

According to the fifth embodiment of the present disclosure, there is provided the negative electrode active material for a lithium secondary battery as defined in any one of the first to the fourth embodiments, wherein the coating layer comprises the polymer, wherein the polymer is polyacrylate, polyacrylonitrile or a mixture thereof.

According to the sixth embodiment of the present disclosure, there is provided the negative electrode active material for a lithium secondary battery as defined in any one of the first to the fifth embodiments, wherein the coating layer comprises the carbon, wherein the carbon in the coating layer is derived from at least one of pitch, acetylene, methane, amorphous carbon, natural graphite, artificial graphite, activated carbon, mesocarbon microbeads, or carbon fibers.

According to the seventh embodiment of the present disclosure, there is provided the negative electrode active material for a lithium secondary battery as defined in any one of the first to the sixth embodiments, which further includes at least one of graphite, soft carbon, or hard carbon.

In another aspect of the present disclosure, there is also provided a negative electrode as defined in the following embodiment.

According to the eighth embodiment of the present disclosure, there is provided a negative electrode including a current collector, and a negative electrode active material layer disposed on at least one surface of the current collector, wherein the negative electrode active material layer includes the negative electrode active material for a lithium secondary battery as defined in any one of the first to the seventh embodiments.

In still another aspect of the present disclosure, there is also provided a lithium secondary battery as defined in the following embodiment.

According to the ninth embodiment of the present disclosure, there is also provided a lithium secondary battery including the negative electrode as defined in the eighth embodiment.

Advantageous Effects

The negative electrode active material for a lithium secondary battery according to an embodiment of the present disclosure includes specific silicon particles, i.e. silicon particles satisfying a full width at half maximum (FWHM) of peak ranging from 2 to 10 in the particle diameter distribution having an average particle diameter ($D_{50}$) of 1~30 μm, and a coating layer surrounding the silicon particles, wherein the coating layer includes at least one of carbon and a polymer. Thus, it is possible to significantly improve both the life characteristics and output characteristics of a secondary battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided a negative electrode active material for a lithium secondary battery which includes: silicon particles; and a coating layer surrounding the silicon particles, wherein the silicon particles have a full width at half maximum (FWHM) of peak ranging from 2 to 10 in the particle diameter distribution having an average particle diameter ($D_{50}$) of 1-30 μm, and the coating layer includes at least one of carbon and a polymer.

Silicon particles contained in the negative electrode active material for a lithium secondary battery according to an embodiment of the present disclosure may have an average particle diameter ($D_{50}$) of 1-30 μm, or 2-28 μm. The silicon particles may have a full width at half maximum (FWHM) of peak ranging from 2 to 10, or 4 to 8, in the particle diameter distribution having an average particle diameter ($D_{50}$) of 1-30 μm.

As used herein, 'average particle diameter ($D_{50}$)' means the particle diameter corresponding to 50% of volume accumulation based on amount of particles in the particle diameter distribution determined by laser diffraction particle distribution analysis.

Figure 1:
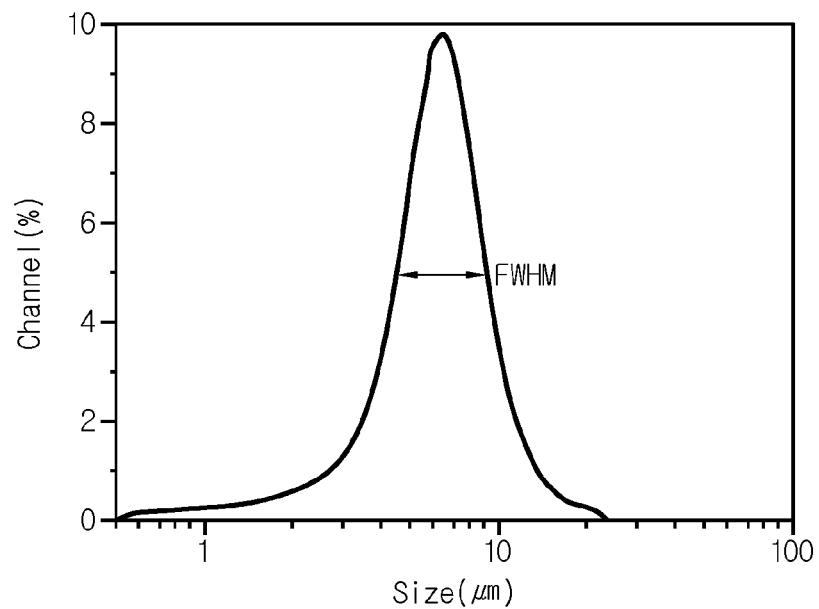
FIG. 1 is a particle diameter distribution graph of silicon particles contained in the negative electrode active material according to an embodiment of the present disclosure.

As used herein, 'full width at half maximum (FWHM)' refers to uniformity of particle diameter distribution represented by a number. For example, FWHM may be calculated by fitting a particle diameter distribution curve by using the Lorentzian distribution and calculating the width at ½ of the peak in a single-peak distribution curve. In this manner, FIG. 1 shows a particle diameter distribution graph of silicon particles contained in the negative electrode active material according to an embodiment of the present disclosure.

According to the present disclosure, when the silicon particles have a FWHM smaller than 2, the number of particles having the same size is excessively large so that the contact between particles is reduced relatively, resulting in the problem of degradation of life characteristics. In addition, when the silicon particles have a FWHM larger than 10, particle diameter distribution becomes non-uniform, and thus the contact between particles is increased excessively to cause pore blocking and an increase in resistance, resulting in the problem of degradation of output characteristics.

Herein, silicon particles satisfying a full width at half maximum (FWHM) of 2-10 in the particle diameter distribution having an average particle diameter ($D_{50}$) of 1-30 μm may be those having a controlled size by separating excessively small particles (fine powder) and large particles (large powder) through an air classifying mill. The air classifying mill is a special fine pulverizer equipped with an air separator therein, and is advantageous to controlling particle diameter by inhibiting excessive pulverization of a material, while providing high pulverization efficiency. After the corresponding material is introduced to such an air classifying mill, the rotation of the air separator is controlled so that the particle diameter distribution of the material may be controlled to a desired level. For example, the air separator may be operated at 6,000-9,000 rpm, or 7,000-8,000 rpm.

According to an embodiment of the present disclosure, the silicon particles may be chunk-like silicon particles or secondary silicon particles formed by aggregation of primary silicon particles having a small particle diameter, or may include both.

When the silicon particles are secondary particles, particle aggregation may be accomplished by a carbonaceous binder, including a fired product of carbonaceous precursor, such as pitch, which imparts binding force. Such aggregated secondary particle-type silicon particles may be advantageous to improvement of the life characteristics of a lithium secondary battery.

As described above, the negative electrode active material according to the present disclosure includes a coating layer surrounding the silicon particles, and the coating layer includes at least one of carbon and a polymer. In other words, the coating layer may include carbon and a polymer, a polymer alone, or carbon alone.

The coating layer is formed on the silicon particles, particularly on the outer surface of the silicon particles.

Figure 2:
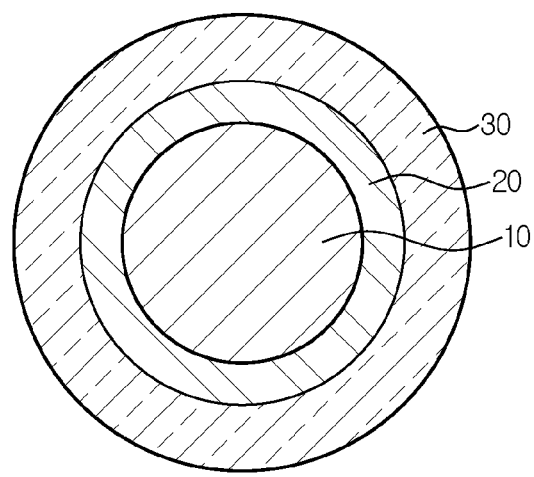
FIG. 2 is a schematic view illustrating the negative electrode active material according to an embodiment of the present disclosure.

The negative electrode active material as shown in FIG. 2 includes a coating layer surrounding silicon particle and the coating layer includes carbon and a polymer, wherein a carbon coating layer 20 is formed first on the outside of the silicon particles 10, and then a polymer coating layer 30 is formed on the outside of the carbon coating layer 20.

Figure 3:
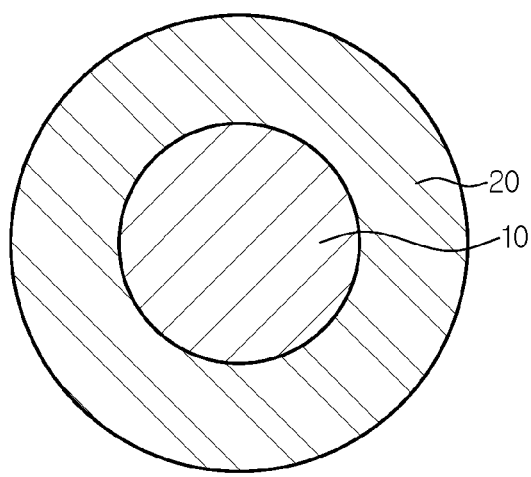
FIG. 3 is a schematic view illustrating the negative electrode active material according to another embodiment of the present disclosure.

The negative electrode active material illustrated in FIG. 3 includes a coating layer surrounding silicon particle, wherein the coating layer includes carbon alone and a carbon coating layer 20 is formed on the outside of the silicon particles 10.

Figure 4:
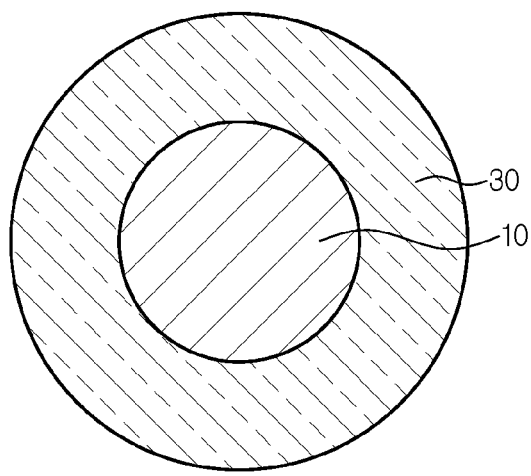
FIG. 4 is a schematic view illustrating the negative electrode active material according to still another embodiment of the present disclosure.

The negative electrode active material illustrated in FIG. 4 includes a coating layer surrounding silicon particle, wherein the coating layer includes a polymer alone and a polymer coating layer 30 is formed on the outside of the silicon particles 10.

The coating layer is formed on the silicon particles. Thus, when the silicon particles undergo a change in volume due to lithium intercalation/deintercalation in the silicon particles, it is possible to prevent or reduce pulverization of the silicon particles and to effectively prevent or reduce side reactions between the silicon particles and an electrolyte. In addition, the coating layer allows the finished negative electrode active material to be provided with excellent conductivity to facilitate reaction with lithium.

When the coating layer includes carbon and a polymer, carbon and the polymer may be incorporated to a single coating layer, or individual coating layers containing each of carbon and the polymer may be formed. When individual coating layers are formed, a carbon coating layer may be formed first on the surface of silicon particles, and then a polymer coating layer may be formed on the carbon coating layer. In a variant, a polymer coating layer may be formed first on the surface of silicon particles, and then a carbon coating layer may be formed on the polymer coating layer. Further, three or more coating layers may be formed on the surface of silicon particles, wherein each layer may be selected from a carbon coating layer, a polymer coating layer and a combined coating layer of carbon with a polymer, and the coating layers may have various combinations thereof.

In the coating layer, carbon may be derived from pitch (such as coal tar pitch, petroleum pitch, etc.), acetylene, methane, amorphous carbon, natural graphite, artificial graphite, activated carbon, mesocarbon microbeads (MCMB), carbon fibers, or two or more such carbon sources.

When the coating layer includes carbon and a polymer, the polymer may be incorporated to the same coating layer together with carbon, or incorporated to an individual coating layer alone, as mentioned above.

The polymer contained in the coating layer assists retention of physical binding between the silicon particles and carbon in the coating layer, and thus inhibits separation of the carbon coating layer caused by a change in volume of the silicon particles, when the silicon particles undergo a change in volume due to lithium intercalation/deintercalation. In addition, the polymer can accept such a change in volume of the silicon particles, and thus it is possible to effectively inhibit the problems caused by a change in volume of the silicon particles.

The polymer contained in the coating layer is not particularly limited, as long as it can provide high electrical conductivity. Particular examples of the polymer may include polyacrylate, polyacrylonitrile, polyethylene oxide, polyvinyl pyrrolidone, polyacrylic acid, polyvinyl alcohol, polyethylene imine, polyacetylene, polyparaphenylene, polypyrrole, polyaniline, or a mixture of two or more of them.

The polymer coating layer formed by using a polymer alone may be a single coating layer or a multilayer having two or more layers stacked successively. When the polymer coating layer is a multilayer, two or more coating layers forming the multilayer may include the same type of polymer or different types of polymers, wherein each of the coating layers may have the same thickness or different thicknesses.

When the average size of pores satisfies the above-defined range, it is possible to ensure a space suitable for alleviating volumetric swelling of the silicon particles, while allowing suitable permeation of an electrolyte through the pores. It is also possible to retain suitable physical binding so that the carbon coating layer may not be separated from the silicon particles.

The negative electrode active material according to an embodiment of the present disclosure may be prepared by the steps of: forming a carbon coating layer on silicon particles; and forming a polymer coating layer on the carbon coating layer. In a variant, the negative electrode active material according to an embodiment of the present disclosure may be prepared by the step of forming a polymer coating layer on silicon particles, or forming a carbon coating layer on silicon particles.

The step of forming a carbon coating layer on silicon particles may be carried out by allowing carbon to grow on the silicon particles, thereby forming a composite. For example, at least one material selected from amorphous carbon, natural graphite, artificial graphite, activated carbon, mesocarbon microbeads (MCMB), carbon fibers, pitch (coal tar pitch, petroleum pitch), acetylene, methane and other organic materials may be used to form a coating layer through a chemical vapor deposition (CVD) process, coating process (applied in the case of pitch), solvent evaporation process, coprecipitation process, precipitation process, sol-gel process, or sputtering process.

The step of forming a polymer coating layer may be carried out by coating a material forming the polymer coating layer directly on the carbon coating layer or silicon particles. For example, polyacrylate, polyacrylonitrile, polyethylene oxide, polyvinyl pyrrolidone, polyacrylic acid, polyvinyl alcohol, polyethylene imine, or a mixture thereof may be used to form a coating layer through a chemical vapor deposition (CVD) process, solvent evaporation process, coprecipitation process, precipitation process, sol-gel process or a sputtering process.

As described above, the polymer coating layer may be a single layer or multilayer having two or more layers stacked successively. In the case of a multilayer, the method for preparing a negative electrode active material may further include a step of forming an additional polymer coating layer on the previously formed polymer coating layer.

In another aspect of the present disclosure, there is provided a negative electrode including the negative electrode active material providing improved life characteristics and output characteristics.

Particularly, the negative electrode according to an embodiment of the present disclosure includes a current collector, and a negative electrode active material layer including the negative electrode active material according to the present disclosure on at least one surface of the current collector.

The electrode may be obtained by coating slurry for a negative electrode active material layer, prepared by dispersing the negative electrode active material according to the present disclosure, a binder and a conductive material into a solvent, to at least one surface of the current collector, followed by drying and pressing.

The current collector is not particularly limited, as long as it causes no chemical change in the corresponding battery and has conductivity. Particular examples of the current collector may include copper, stainless steel, aluminum, nickel, titanium, baked carbon, copper or stainless steel surface-treated with carbon, nickel, titanium or silver, aluminum-cadmium alloy, or the like. Although the thickness of the current collector is not particularly limited, the current collector may have a thickness of 3-500 μm as used currently.

The negative electrode active material may be used in an amount of 80-99 wt % based on the total weight of the negative electrode slurry composition.

The binder is an ingredient which assists binding between the electrode active material and the conductive material and binding to the current collector. In general, the binder is used in an amount of 0.1-20 wt % based on the total weight of the negative electrode slurry composition. Particular examples of the binder include polyvinylidene fluoride-co-hexafluoropropylene (PVDF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, polyacrylic acid, styrene butadiene rubber (SBR), lithium polyacrylate (Li-PAA), or the like. More particularly, lithium polyacrylate can impart higher adhesion as compared to the other binders, such as SBS/CMC, when it is used for a negative electrode including an active material having a high silicon content of about 80%. By virtue of the above-mentioned characteristic, lithium polyacrylate is advantageous in that it is possible to accomplish high capacity retention during charge/discharge, when lithium polyacrylate is used for a Si-based negative electrode.

The conductive material is not particularly limited, as long as it causes no chemical change in the corresponding battery and has conductivity. Particular examples of the conductive material include: carbon black, such as carbon black, acetylene black, Ketjen black, channel black, furnace black, lamp black or thermal black; conductive fibers, such as carbon fibers or metallic fibers; fluorocarbon; metal powder, such as aluminum or nickel powder; conductive whisker, such as zinc oxide or potassium titanate; conductive metal oxide, such as titanium oxide; or the like. The conductive material may be added in an amount of 0.1-20 wt %, based on the total weight of the negative electrode slurry composition.

The dispersion medium may include water or an organic solvent (such as N-methyl-2-pyrrolidone (NMP)), and may be used in such an amount that the negative electrode slurry including the negative electrode active material optionally with a binder and conductive material may have a desired level of viscosity.

In addition, there is no particular limitation in the coating process of the negative electrode slurry, as long as it is a method used currently in the art. For example, a coating process using a slot die may be used. In addition to this, a Mayer bar coating process, gravure coating process, dip coating process, spray coating process, etc. may be used.

In still another aspect of the present disclosure, there is provided a lithium secondary battery including the negative electrode. Particularly, the lithium secondary battery may be obtained by injecting a lithium salt-containing electrolyte to an electrode assembly including a positive electrode, the above-described negative electrode, and a separator interposed between the positive electrode and the negative electrode.

The positive electrode may be obtained by mixing a positive electrode active material, conductive material, binder and a solvent to form slurry and coating the slurry directly onto a metal current collector, or casting the slurry onto a separate support, peeling a positive electrode active material film from the support and laminating the film on a metal current collector.

The positive electrode active material used in the positive electrode active material layer may be any one active material selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic ratio of an element forming oxide, and $0 \leq x<0.5$, $0 \leq y<0.5$, $0 \leq z<0.5$, and $0<x+y+z<1$), or a mixture of at least two of them.

Meanwhile, the same conductive material, binder and solvent as used for manufacturing the negative electrode may be used.

The separator may be a conventional porous polymer film used conventionally as a separator. For example, the porous polymer film may be a porous polymer film made of a polyolefininc polymer, such as ethylene homopolymer, propylene homopolymer, ethylene-butene copolymer, ethylene/hexene copolymer or ethylene/methacrylate copolymer. Such a porous polymer film may be used alone or in the form of a laminate. In addition, an insulating thin film having high ion permeability and mechanical strength may be used. The separator may include a safety reinforced separator (SRS) including a ceramic material coated on the surface of the separator to a small thickness. In addition, a conventional porous non-woven web, such as non-woven web made of high-melting point glass fibers or polyethylene terephthalate fibers, may be used, but the scope of the present disclosure is not limited thereto.

The electrolyte includes a lithium salt as an electrolyte salt and an organic solvent for dissolving the lithium salt.

Any lithium salt used conventionally for an electrolyte for a secondary battery may be used without particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The organic solvent contained in the electrolyte may be any organic solvent used conventionally without particular limitation. Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulfolane, gamma-butyrolactone, propylene sulfite, and tetrahydrofuran.

Particularly, among the carbonate-based organic solvents, ethylene carbonate and propylene carbonate, which are cyclic carbonates, are organic solvents having high viscosity and a high dielectric constant, and thus may be used preferably, since they can dissociate the lithium salt in the electrolyte with ease. When such a cyclic carbonates is used after mixing it with a linear carbonate having low viscosity and a low dielectric constant, such as dimethyl carbonate or diethyl carbonate, it is possible to prepare an electrolyte having higher electrical conductivity, more preferably.

Optionally, the electrolyte used according to the present disclosure may further include additives contained in the conventional electrolyte, such as an overcharge-preventing agent, or the like.

The lithium secondary battery according to an embodiment of the present disclosure may be obtained by interposing the separator between the positive electrode and the negative electrode to form an electrode assembly, introducing the electrode assembly to a pouch, cylindrical battery casing or a prismatic battery casing, and then injecting the electrolyte thereto to finish a secondary battery. Otherwise, the lithium secondary battery may be obtained by stacking the electrode assemblies, impregnating the stack with the electrolyte, and introducing the resultant product to a battery casing, followed by sealing.

According to an embodiment of the present disclosure, the lithium secondary battery may be a stacked, wound, stacked and folded or a cable type battery.

The lithium secondary battery according to the present disclosure may be used for a battery cell used as a power source for a compact device, and may be used preferably as a unit battery for a medium- or large-size battery module including a plurality of battery cells. Particular examples of such medium- or large-size devices include electric vehicles, hybrid electric vehicles, plug-in hybrid electric vehicles, power storage systems, or the like. Particularly, the lithium secondary battery may be useful for batteries for hybrid electric vehicles and new & renewable energy storage batteries, requiring high output.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

<Manufacture of Negative Electrode Active Material and Negative Electrode>

Si particles were introduced to an air classifying mill (TC-15, Nisshin Engineering), and then the mill was operated at a rotation speed of 8,000 rpm to remove fine powder and large powder, thereby providing Si (silicon) particles having an average particle diameter ($D_{50}$) of 5 μm and a full width at half maximum (FWHM) of 4.

The resultant silicon particles were introduced to a thermal CVD chamber and a mixed gas of ethylene gas with argon was supplied thereto, followed by heating to 800° C., thereby forming a carbon coating layer on the silicon particles. The silicon particles having a carbon coating layer were dipped in N-methyl-2-pyrrolidone (NMP) containing polyacrylonitrile (PAN) and agitation was carried out sufficiently by using an agitator. The agitated product was received in a 2 L round-bottom flask and NMP was removed by using a rotating heater to obtain a negative electrode active material including a coating layer surrounding the silicon particles, wherein the coating layer included carbon and a polymer. Particularly, the carbon coating layer was formed on the surface of silicon particles and the polymer coating layer was formed on the carbon coating layer.

The resultant negative electrode active material, carbon black as a conductive material, lithium polyacrylate (Li-PAA) as a binder were mixed at a weight ratio of 80:10:10 and the resultant mixture was added to distilled water as a dispersion medium to obtain negative electrode slurry. The negative electrode slurry was applied to a current collector, copper foil having a thickness of 20 μm, followed by drying. During the drying, the circulating air had a temperature of 60° C. Then, pressing was carried out by using a roll press and drying was carried out in a vacuum oven at 130° C. for 12 hours, followed by cutting into a circular shape having an area of 1.4875 cm². In this manner, a negative electrode was obtained.

<Manufacture of Lithium Secondary Battery>

The resultant negative electrode was used as a working electrode and Li metal foil cut into a circular shape having an area of 1.7671 cm² was used as a counter electrode. In addition, a porous polyethylene separator was interposed between the working electrode and the counter electrode to form an electrode assembly. Then, vinylene carbonate (VC) as an additive for non-aqueous electrolyte was dissolved at 0.5 wt % in a mixed solvent containing ethyl methyl carbonate (EMC) and ethylene carbonate (EC) at a volume ratio of 7:3, and 1M $LiPF_6$ was added thereto to prepare a non-aqueous electrolyte. The electrode assembly was received in a coin-type casing and the non-aqueous electrolyte was injected thereto to obtain a coin-type half-cell secondary battery.

Example 2

<Manufacture of Negative Electrode Active Material and Negative Electrode>

Si particles were introduced to an air classifying mill (TC-15, Nisshin Engineering), and then the mill was operated at a rotation speed of 8,000 rpm to remove fine powder and large powder, thereby providing Si (silicon) particles having an average particle diameter ($D_{50}$) of 5 μm and a full width at half maximum (FWHM) of 4.

The resultant silicon particles were dipped in N-methyl-2-pyrrolidone (NMP) containing polyacrylonitrile (PAN) and agitation was carried out sufficiently by using an agitator. The agitated product was received in a 2 L round-bottom flask and NMP was removed by using a rotating heater to obtain a negative electrode active material including a coating layer surrounding the silicon particles, wherein the coating layer included a polymer.

The resultant negative electrode active material, carbon black as a conductive material, lithium polyacrylate (Li-PAA) as a binder were mixed at a weight ratio of 80:10:10 and the resultant mixture was added to distilled water as a dispersion medium to obtain negative electrode slurry. The negative electrode slurry was applied to a current collector, copper foil having a thickness of 20 μm, followed by drying. During the drying, the circulating air had a temperature of 60° C. Then, pressing was carried out by using a roll press and drying was carried out in a vacuum oven at 130° C. for 12 hours, followed by cutting into a circular shape having an area of 1.4875 cm². In this manner, a negative electrode was obtained.

<Manufacture of Lithium Secondary Battery>

The resultant negative electrode was used as a working electrode and Li metal foil cut into a circular shape having an area of 1.7671 cm² was used as a counter electrode. In addition, a porous polyethylene separator was interposed between the working electrode and the counter electrode to form an electrode assembly. Then, vinylene carbonate (VC) as an additive for non-aqueous electrolyte was dissolved at 0.5 wt % in a mixed solvent containing ethyl methyl carbonate (EMC) and ethylene carbonate (EC) at a volume ratio of 7:3, and 1M $LiPF_6$ was added thereto to prepare a non-aqueous electrolyte. The electrode assembly was received in a coin-type casing and the non-aqueous electrolyte was injected thereto to obtain a coin-type half-cell secondary battery.

Example 3

<Manufacture of Negative Electrode Active Material and Negative Electrode>

Si particles were introduced to an air classifying mill (TC-15, Nisshin Engineering), and then the mill was operated at a rotation speed of 8,000 rpm to remove fine powder and large powder, thereby providing Si (silicon) particles having an average particle diameter ($D_{50}$) of 5 μm and a full width at half maximum (FWHM) of 4.

The resultant silicon particles were introduced to a thermal CVD chamber and a mixed gas of ethylene gas with argon was supplied thereto, followed by heating to 800° C., thereby forming a carbon coating layer on the silicon particles.

The resultant negative electrode active material, carbon black as a conductive material, lithium polyacrylate (Li-PAA) as a binder were mixed at a weight ratio of 80:10:10 and the resultant mixture was added to distilled water as a dispersion medium to obtain negative electrode slurry. The negative electrode slurry was applied to a current collector, copper foil having a thickness of 20 μm, followed by drying. During the drying, the circulating air had a temperature of 60° C. Then, pressing was carried out by using a roll press and drying was carried out in a vacuum oven at 130° C. for 12 hours, followed by cutting into a circular shape having an area of 1.4875 cm². In this manner, a negative electrode was obtained.

<Manufacture of Lithium Secondary Battery>

The resultant negative electrode was used as a working electrode and Li metal foil cut into a circular shape having an area of 1.7671 cm² was used as a counter electrode. In addition, a porous polyethylene separator was interposed between the working electrode and the counter electrode to form an electrode assembly. Then, vinylene carbonate (VC) as an additive for non-aqueous electrolyte was dissolved at 0.5 wt % in a mixed solvent containing ethyl methyl carbonate (EMC) and ethylene carbonate (EC) at a volume ratio of 7:3, and 1M $LiPF_6$ was added thereto to prepare a non-aqueous electrolyte. The electrode assembly was received in a coin-type casing and the non-aqueous electrolyte was injected thereto to obtain a coin-type half-cell secondary battery.

Example 4

A negative electrode active material, negative electrode and a lithium secondary battery were obtained in the same manner as described in Example 1, except that Si (silicon) particles having an average particle diameter ($D_{50}$) of 5 μm and a full width at half maximum (FWHM) of 8 were used.

Example 5

A negative electrode active material, negative electrode and a lithium secondary battery were obtained in the same manner as described in Example 2, except that Si (silicon) particles having an average particle diameter ($D_{50}$) of 5 μm and a full width at half maximum (FWHM) of 8 were used.

Example 6

A negative electrode active material, negative electrode and a lithium secondary battery were obtained in the same manner as described in Example 3, except that Si (silicon) particles having an average particle diameter ($D_{50}$) of 5 μm and a full width at half maximum (FWHM) of 8 were used.

Comparative Example 1

A negative electrode active material, negative electrode and a lithium secondary battery were obtained in the same manner as described in Example 1, except that Si (silicon) particles having an average particle diameter ($D_{50}$) of 5 μm and a full width at half maximum (FWHM) of 1 were used.

Comparative Example 2

A negative electrode active material, negative electrode and a lithium secondary battery were obtained in the same manner as described in Example 1, except that Si (silicon) particles having an average particle diameter ($D_{50}$) of 5 μm and a full width at half maximum (FWHM) of 11 were used.

Comparative Example 3

A negative electrode active material, negative electrode and a lithium secondary battery were obtained in the same manner as described in Example 1, except that Si (silicon) particles having an average particle diameter ($D_{50}$) of 5 μm and a full width at half maximum (FWHM) of 15 were used.

Comparative Example 4

A negative electrode active material, negative electrode and a lithium secondary battery were obtained in the same manner as described in Example 2, except that Si (silicon) particles having an average particle diameter ($D_{50}$) of 5 μm and a full width at half maximum (FWHM) of 15 were used.

Comparative Example 5

A negative electrode active material, negative electrode and a lithium secondary battery were obtained in the same manner as described in Example 3, except that Si (silicon) particles having an average particle diameter ($D_{50}$) of 5 μm and a full width at half maximum (FWHM) of 15 were used.

<Test Methods>

Methods for Determining Average Particle Diameter and Full Width at Half Maximum In Examples 1-6 and Comparative Examples 1-5, 'average particle diameter $(D_{50})$' was determined by dispersing silicon particles in deionized water at 1 wt % to prepare samples, and measuring a difference in diffraction pattern depending on particle size when the particles pass through laser beams by using a laser diffraction particle size analyzer (Microtrac S3500) to obtain particle diameter distribution. In other words, 'average particle diameter $(D_{50})$' means the particle diameter corresponding to 50% of volume accumulation based on amount of particles in the particle diameter distribution determined by laser diffraction particle distribution analysis.

In addition, 'full width at half maximum (FWHM)' of Si particles according to each of Examples 1-6 and Comparative Examples 1-5 was calculated by measuring the width of peak at the point corresponding to ½ thereof in the previously obtained particle diameter distribution curve.

Evaluation of Life Characteristics of Secondary Battery

Each of the lithium secondary batteries according to Examples 1-6 and Comparative Examples 1-5 was evaluated in terms of life characteristics. Herein, life characteristics of each secondary battery was evaluated as cycle capacity retention.

To test the cycle capacity retention, each battery was charged/discharged at 0.1C during the first cycle and the second cycle, and at 0.5C during the third cycle or later cycles (Charge condition: constant current/constant voltage (CC/CV), 5 mV/0.005 C cut-off, Discharge condition: CC, 1.5V cut-off).

The cycle capacity retention was calculated according to the following formula: Cycle capacity retention (%)=[(Discharge capacity at the $N^{th}$ cycle)/(Discharge capacity at the first cycle)]×100 (wherein N is an integer larger than 1).

The cycle capacity retention at the $50^{th}$ cycle of each battery was shown in the following Table 1.

Evaluation of Output Characteristics of Secondary Battery

Each of the lithium secondary batteries according to Examples 1-6 and Comparative Examples 1-5 was evaluated in terms of resistance.

Particularly, evaluation of resistance was carried out by carrying out discharge at 1.5 C for 30 seconds in a state of charge (SOC) of 50% in each negative electrode to measure a change in voltage, and calculating the resistance value according to the formula of 'resistance=voltage/current'.

Relative resistance values of Examples 2-6 and Comparative Examples 1-5 are shown in Table 1, as the resistance value of Example 1 is taken as 100%.

TABLE 1

|  | Cycle capacity retention (%) | Output characteristics (%) |
|---|---|---|
| Example 1 | 84 | 100 |
| Example 2 | 81 | 97 |
| Example 3 | 80 | 101 |
| Example 4 | 82 | 99 |
| Example 5 | 80 | 95 |
| Example 6 | 80 | 100 |
| Comp. Ex. 1 | 56 | 97 |
| Comp. Ex. 2 | 74 | 92 |
| Comp. Ex. 3 | 69 | 90 |
| Comp. Ex. 4 | 66 | 89 |
| Comp. Ex. 5 | 65 | 92 |

As can be seen from Table 1, each of the secondary batteries, which uses a negative electrode active material for a lithium secondary battery, including silicon particles; and a coating layer surrounding the silicon particles, wherein the silicon particles have a full width at half maximum (FWHM) of peak ranging from 2 to 10 in the particle diameter distribution having an average particle diameter $(D_{50})$ of 1-30 μm, and the coating layer includes at least one of carbon and a polymer, according to Examples 1-6, shows excellent life characteristics represented by cycle capacity retention and excellent output characteristics.

On the contrary, it can be seen that each of the secondary batteries using a negative electrode active material having a full width at half maximum of peak less than 2 or larger than 10 in the particle diameter distribution, according to Comparative Examples 1-5, shows significantly low cycle capacity retention and poor life characteristics, and cannot realize sufficient output characteristics.

What is claimed is:

1. A negative electrode active material for a lithium secondary battery, comprising:
   silicon particles; and
   a coating layer surrounding respective silicon particles,
   wherein the silicon particles have a full width at half maximum (FWHM) of peak ranging from 4 to 8 in a particle diameter distribution having an average particle diameter $(D_{50})$ of 1 μm to 30 μm, and
   wherein the coating layer comprises at least one selected from the group consisting of carbon and a polymer.

2. The negative electrode active material for the lithium secondary battery according to claim 1, wherein the particle diameter distribution of the silicon particles is controlled by using an air classifying mill.

3. The negative electrode active material for the lithium secondary battery according to claim 1, wherein the coating layer is present in an amount of 3 parts by weight to 10 parts by weight based on 100 parts by weight of the silicon particles.

4. The negative electrode active material for the lithium secondary battery according to claim 1, wherein the coating layer comprises the polymer, wherein the polymer is polyacrylate, polyacrylonitrile or a mixture thereof.

5. The negative electrode active material for the lithium secondary battery according to claim 1, wherein the coating layer comprises the carbon, wherein the carbon in the coating layer is derived from at least one of pitch, acetylene, methane, amorphous carbon, natural graphite, artificial graphite, activated carbon, mesocarbon microbeads, or carbon fibers.

6. The negative electrode active material for the lithium secondary battery according to claim 1, further comprising at least one of graphite, soft carbon, or hard carbon.

7. A negative electrode, comprising:
   a current collector, and
   a negative electrode active material layer disposed on at least one surface of the current collector,
   wherein the negative electrode active material layer comprises the negative electrode active material for the lithium secondary battery as defined in claim 1.

8. A lithium secondary battery comprising the negative electrode as defined in claim 7.

* * * * *